United States Patent
Vasu et al.

(10) Patent No.: US 9,846,702 B2
(45) Date of Patent: Dec. 19, 2017

(54) INDEXING OF FILE IN A HADOOP CLUSTER

(71) Applicant: TATA CONSULTANCY SERVICES LIMITED, Mumbai (IN)

(72) Inventors: Arun Vasu, Kochi (IN); Jishnu Kurunthala, Kochi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 345 days.

(21) Appl. No.: 14/498,598

(22) Filed: Sep. 26, 2014

(65) Prior Publication Data

US 2015/0120695 A1   Apr. 30, 2015

(30) Foreign Application Priority Data

Oct. 31, 2013 (IN) .......................... 3472/MUM/2013

(51) Int. Cl.
*G06F 17/30* (2006.01)

(52) U.S. Cl.
CPC .. *G06F 17/30194* (2013.01); *G06F 17/30321* (2013.01)

(58) Field of Classification Search
CPC ..................... G06F 17/30194; G06F 17/30321
See application file for complete search history.

(56) References Cited

U.S. PATENT DOCUMENTS

| | | | |
|---|---|---|---|
| 8,650,159 B1* | 2/2014 | Zhang ............... | G06F 17/30156 707/664 |
| 9,092,151 B1* | 7/2015 | Floyd ................ | G06F 17/30303 |
| 2010/0205160 A1* | 8/2010 | Kumar .............. | G06F 17/30336 707/696 |
| 2010/0217837 A1* | 8/2010 | Ansari ................... | G06Q 30/04 709/218 |
| 2011/0196854 A1* | 8/2011 | Sarkar ............... | G06F 17/30616 707/709 |
| 2012/0030018 A1* | 2/2012 | Passmore .......... | G06F 17/30702 705/14.52 |
| 2015/0112996 A1* | 4/2015 | Mishra ............. | G06F 17/30321 707/741 |
| 2015/0142756 A1* | 5/2015 | Watkins ............ | G06F 17/30194 707/692 |

OTHER PUBLICATIONS

Manning et al., "Introduction to Information Retrieval", Section 4.4, "Distributed indexing", Cambridge University Press, Apr. 7, 2009, 4 pages.*

(Continued)

*Primary Examiner* — Alexander Khong
(74) *Attorney, Agent, or Firm* — Seed IP Law Group LLP

(57) ABSTRACT

A file indexing system for indexing a file to be stored onto a distributed file system includes a segmentation module to segment the file into a plurality of segments. The file indexing system further includes an index generation module to initiate indexing of the file through a plurality of nodes of a Hadoop cluster, where each of the plurality of nodes indexes one or more segments from amongst the plurality of segments to generate at least one index corresponding to the one or more segments. The file indexing system further includes an index transfer module to store the at least one index onto the distributed file system.

16 Claims, 2 Drawing Sheets

(56) References Cited

OTHER PUBLICATIONS

"Introducing Cloudera Search," Sep. 23, 2013, retrieved from www..cloudera.com/content/cloudera-docs/Search/latest/Cloudera-Search-User-Guide/csug_introducing.html, 2 pages.
"Lucene Index," Jul. 27, 2011, retrieved from https://code.google.com/p/gbif-occurrencestore/wiki/LuceneIndexing, 3 pages.

* cited by examiner

INDEXING OF FILE IN A HADOOP CLUSTER

TECHNICAL FIELD

The present subject matter relates, in general, to indexing of a file and, in particular, to indexing of the file to be stored onto a distributed file system.

BACKGROUND

The amount of information available to people is growing exponentially every day due to advancement in communication and information technologies and the Internet. As the amount of available information grows, a requirement to efficiently search this information becomes more apparent.

A typical way of handling such a large amount of information, such that it can be easily searched, is to index the information. For example, to search content of a file, an index may be generated corresponding to the file by categorizing the content of the file. The index may contain data derived from the file that allows queries about the content of the file to be performed efficiently. Referring to above example, the index may be generated using a Lucene Application Programming Interface (API). Lucene is a Java library which performs indexing and searching process for files. Once the index is generated, it may be stored onto a search engine, such as a Solr search engine so that it can be accessed and manipulated to answer user-generated queries.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which.

DETAILED DESCRIPTION

Figure 1:
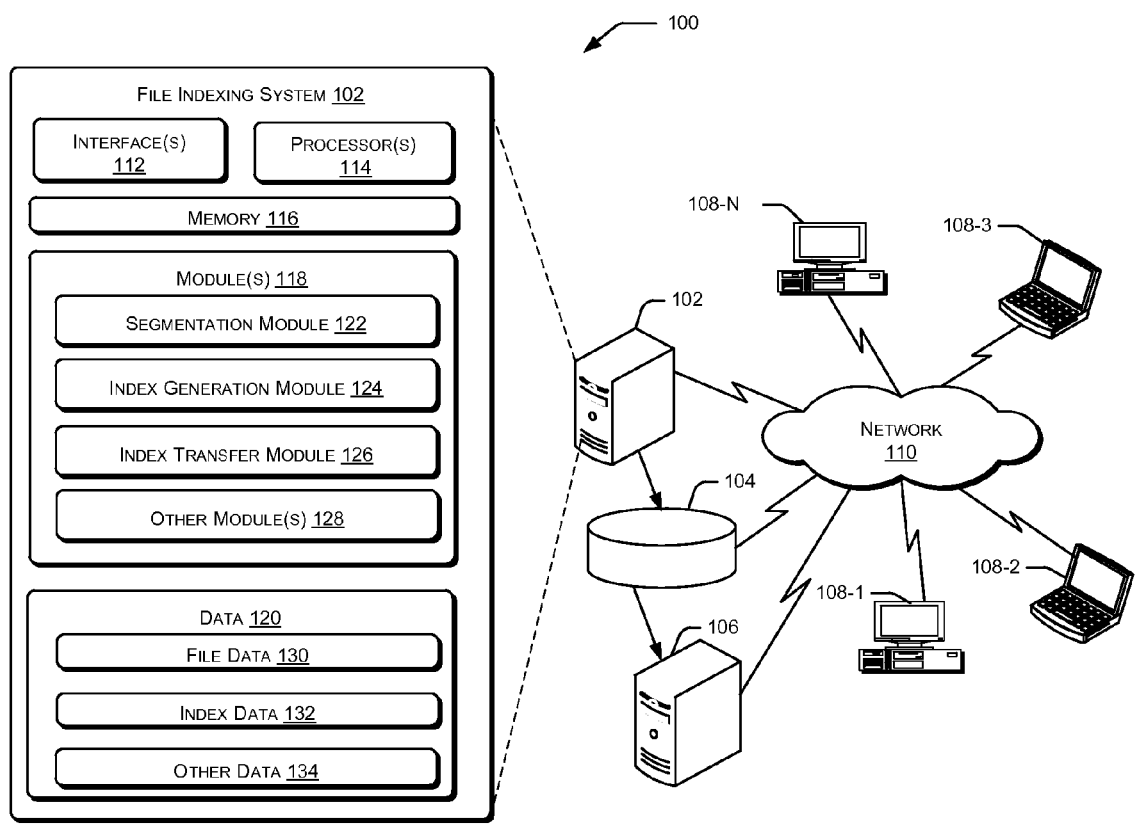
FIG. 1 illustrates a network environment implementing a file indexing system, according to an embodiment of the present subject matter.

With the advent of technology and increasing growth in amount of information, organizations are using search engines, such as a Solr search engine to provide a quick access to users to any desired data that may be buried in large and widely available information. The solr search engine is an open source enterprise search platform that uses a Lucene Application Programming Interface (API) for full-text indexing and searching.

Conventionally, to search content of a large file, say of size one petabyte, the file is first indexed to generate an index corresponding to the file. File indexing is a process of associating or tagging the file with different search terms. For example, the file may be indexed in terms of meta-information, such as keywords in the file specifying contextual information of the file. The indexing may be performed using a Lucene API which is a Java library that is able to perform indexing and searching process. The index may contain data derived from the file that allows queries about the content of the file to be performed efficiently. Once the index is generated, the same can be transferred to a search engine, such as a Solr search engine, over a network for storage. The Solr search engine can then be used to search the content of the file through the index. Generally, a Hypertext Transfer Protocol (HTTP) is used to transfer the generated index to the search engine for storage. As would be understood, HTTP transfer is a protocol over which data can be transferred.

However, implementation of this method to transfer the index, generated corresponding to the file, to the search engine, may pose certain challenges. For example, if size of the file is one petabyte, then the generated index would also be of very large size, say in gigabytes. Further, since HTTP is not designed for transferring bulk data, there is typically large overhead associated with an HTTP data transfer and the time consumed is also very large. Therefore, the index may not be efficiently transferred to the search engine over the HTTP.

Also, since networks are inherently unreliable due to their expanse and complexity, the probability of network failure increases in proportion to the amount of data that is transmitted. Therefore, in case of network failure or some other issue during the transmission of the index, the index may not be transmitted at all. In such a scenario, the index may have to be retransmitted, thereby increasing the index transfer time, and hence may affect the search process. Therefore, the conventional method for transferring the index to the search engine over the HTTP may be time consuming, inefficient, and may include high communication costs.

The present subject matter describes systems and methods for indexing a file to be stored onto a distributed file system. According to the present subject matter, indexing of the file is carried out at an enhanced map phase. The enhanced map phase is carried out by a plurality of nodes, i.e., mappers for indexing the file. When the file is provided as an input to the enhanced map phase, the file is split into multiple segments and input to each mapper is one or more segments from amongst the multiple segments of the file. Each mapper generates at least one index corresponding to the one or more segments and stores the same in a distributed file system, such as a Hadoop Distributed File System (HDFS). The at least one index generated by mapper may then be transferred from the distributed file system to the search engine over a network using a transfer protocol, such as a Secure Shell (SSH) protocol, HTTP, etc, unlike the conventional approach where, only one index is generated corresponding to the file and is transferred to the search engine using HTTP. In one implementation, the search engine may be deployed at a third party location. In another implementation, the search engine may be integrated within the distributed file system.

Since, the file is first segmented into multiple segments and multiple indices are generated corresponding to the multiple segments, therefore size of each index is less in comparison to the single index generated through the conventional approach. Consider an example, if a file of 10 gigabytes (GB) is to be indexed, the file may be indexed to generate 10 indices of size 50 megabytes (MB) each. As a result, the time taken to transfer the indices to the search engine is significantly alleviated. Further, according to an embodiment of the present subject matter, if there is a network failure or transfer of one or more indices is interrupted, then only those one or more indices may have to be retransmitted and not the entire index, as done by the conventional approach. As a result, the indices are transferred to the search engine, such as a Solr search engine, in very less time and network overhead is also eliminated.

Further, as mentioned above, the search engine may be integrated within the distributed file system. Therefore, in situations where the search engine is integrated within the distributed file system, transmission of the generated indices from the distributed file system to the search engine over a network may not be needed. Since, generation and storage of the indices occur without transfer of indices over the network, the network overhead is eliminated and network resources are efficiently consumed. Also, the time delay for storage of the indices onto the distributed file system is alleviated. Thus, according to the present subject matter, the generation and transfer of the indices to the distributed file system is efficient in terms of cost, resources, and time.

According to an implementation, initially, a file to be indexed is received from a client device. In said implementation, the file may be a text file. A text file is a file that is structured as a sequence of lines. Upon receiving the file to be indexed, the file may be segmented into a plurality of segments. In one implementation, the file may be segmented into equally sized segments. In another implementation, the file may be segmented into differently sized segments.

Once the file is segmented into the plurality of segments, indexing of the file may be initiated. Indexing is a process of converting text data into a format that facilitates rapid searching. In one implementation, the indexing of the file may be initiated through a plurality of nodes of a Hadoop cluster. In said implementation, one or more segments from amongst the plurality of segments may be allocated to each of the plurality of nodes. Further, each of the plurality of nodes may index one or more segments of the file allocated to it to generate at least one index corresponding to the one or more segments. In one example, the at least one index may store information about the file, including file name, date modified, and properties like author, tags, file content, and rating. According to an implementation, the plurality of nodes may generate a set of indices using a Lucene Application Programming Interface (API). Lucene is a Java library which performs indexing and searching process for files.

After generation of the set of indices, each of the plurality of nodes may store its respective indices onto a distributed file system, such as a Hadoop Distributed File System (HDFS). The HDFS is a storage system of the Hadoop cluster. Thereafter, the set of indices may be transferred from the distributed file system to a search engine, such as a Solr search engine, over a network to make the file content searchable. In one implementation, the search engine may be deployed at a third party location. In another implementation, the search engine may be integrated within with the distributed file system. Further, at least one index generated by a node from amongst the plurality of nodes, corresponding to the one or more segments, is transferred from the distributed file system to the search engine using a transfer protocol, such as a Secure Shell (SSH) protocol, HTTP, etc. In one implementation, the at least one index generated by the node from amongst the plurality of nodes may be transferred through a respective transfer protocol connection. In another implementation, the at least one index generated by each of the plurality of nodes may be transferred through a same transfer protocol connection.

In one implementation, in situations where the search engine is integrated within the distributed file system, transmission of the generated indices from the distributed file system to the search engine over the network may not be needed.

According to an implementation, the search engine may include one or more search machines. For example, a Solr search engine may include one or more solr shard instances. In said implementation, an agent deployed on each of the one or more search machines may be invoked to transfer the set of indices from the distributed file system to the one or more search machines. The agent may be understood as a stand alone java program. In one implementation, the agent may be invoked by a remote client program, for example, a web application. The one or more search machines of the search engine may then merge the set of indices with existing indices to make the file content searchable.

According to the present subject matter, since the file is first segmented into multiple segments and multiple indices are generated corresponding to the multiple segments, therefore size of each index would be very less in comparison to the single index generated through the conventional approach. As a result, the time taken to transfer the indices to the search engine is significantly alleviated. Further, according to an embodiment of the present subject matter, if there is a network failure or transfer of one or more indices is interrupted, then only those one or more indices may have to be retransmitted and not the entire index, as done by the conventional approach. As a result, the indices are transferred to the search engine, such as a Solr search engine, in very less time and network overhead is also eliminated.

Further, as mentioned above, the search engine may be integrated within with the distributed file system. Therefore, in situations where the search engine is integrated within the distributed file system, transmission of the generated indices from the distributed file system to the search engine over a network may not be needed. Since, generation and storage of the indices occur without transfer of indices over the network, the network overhead is eliminated and network resources are efficiently consumed. Also, the time delay for storage of the indices onto the distributed file system is alleviated. Thus, according to the present subject matter, the generation and transfer of the indices to the distributed file system is efficient in terms of cost, resources, and time.

The following disclosure describes a system and a method for indexing a file to be stored onto a distributed file system. While aspects of the described system and method can be implemented in any number of different computing systems, environments, and/or configurations, embodiments for the information extraction system are described in the context of the following exemplary system(s) and method(s).

FIG. 1 illustrates a network environment 100 implementing a file indexing system 102, according to an embodiment of the present subject matter. In said embodiment, the network environment 100 includes the file indexing system 102 for indexing a file into a set of indices to be stored onto a distributed file system 104. The file indexing system 102 may further transfer the set of indices from the distributed file system 104 to a search engine 106 for storage.

In one implementation, the network environment 100 can be a public network environment, including personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones. The file indexing system 102 may be implemented in a variety of computing systems, such as a laptop computer, a desktop computer, a workstation, and a network.

Further, it will be understood that the file indexing system 102 may be communicatively connected to the distributed file system 104. The file indexing system 102 processes the file and stores the processed file in the distributed file system 104. Furthermore, the distributed file system 104 may be communicatively connected to the search engine 106. The file indexing system 102 may transfer the processed file from the distributed file system 104 to the search engine 106 for storage. Although the search engine 106 is shown external to the distributed file system 104, it will be appreciated that the search engine 106 can be integrated within the distributed file system 104.

According to an implementation, the distributed file system 104 may be a Hadoop Distributed File System (HDFS). The HDFS is a storage system of a Hadoop cluster and the Hadoop cluster is a computational cluster designed for processing data and storing the processed data. Further, the Hadoop cluster may include a plurality of nodes comprising a master node and one or more worker nodes. Furthermore, the master node of the Hadoop cluster may assign tasks to the one or more worker nodes, for example, a task to process a file. According to an implementation of the present subject matter, the worker node of the Hadoop cluster may be implemented as the file indexing system 102 to initiate indexing of the file through the worker nodes of the Hadoop cluster.

Further, according to an implementation, the search engine 106 may be a Solr search engine. The solr search engine is an open source enterprise search platform that uses a Lucene Application Programming Interface (API) for full-text indexing and searching. Although not shown in FIG. 1, the search engine 106 may include one or more search machines. For example, the Solr search engine may include one or more solr shard instances.

Furthermore, the file indexing system 102 may be connected to a plurality of client devices 108-1, 108-2, 108-3, . . . , 108-N, collectively referred to as client devices 108 and individually referred to as a client device 108. The client device 108 may include, but is not limited to, a desktop computer, a portable computer, a mobile phone, a handheld device, and a workstation.

The client devices 108 are used by clients to exchange information with the file indexing system 102, the distributed file system 104, and the search engine 106 over a network 110. In one implementation, the client devices 108 may transfer a file to be indexed to the file indexing system 102.

As shown in FIG. 1, the client devices 108 are communicatively coupled to the file index system 102 over the network 110 through one or more communication links for communication between the clients and the file indexing system 102. Also, the client devices 108 are communicatively coupled to the distributed file system 104 and the search engine 106 over the network 110.

In one implementation, the network 110 may be a wireless network, a wired network, or a combination thereof. The network 110 may also be an individual network or a collection of many such individual networks, interconnected with each other and functioning as a single large network, e.g., the Internet or an intranet. The network 110 may be implemented as one of the different types of networks, such as intranet, local area network (LAN), wide area network (WAN), the internet, and such. The network 110 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 110 may include a variety of network devices, including routers, bridges, servers, computing devices, storage devices, and the like.

The file indexing system 102 may further include interface(s) 112. Further, the interface(s) 112 may include a variety of software and hardware interfaces, for example, interfaces for peripheral device(s), such as a product board, a mouse, an external memory, and a printer. Additionally, the interface(s) 112 may enable the file indexing system 102 to communicate with other devices, such as web servers and external repositories. The interface(s) 112 may also facilitate multiple communications within a wide variety of networks and protocol types, including wired networks, for example, LAN, cable, etc., and wireless networks, such as WLAN, cellular, or satellite. For the purpose, the interface(s) 112 may include one or more ports.

In an implementation, the file indexing system 102 may include processor(s) 114 coupled to a memory 116. The processor(s) 114 may be implemented as one or more microprocessors, microcomputers, microcontrollers, digital signal processors, central processing units, state machines, logic circuitries, and/or any devices that manipulate signals based on operational instructions. Among other capabilities, the processor(s) 114 may be configured to fetch and execute computer-readable instructions stored in the memory 116.

The memory 116 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the file indexing system 102 may include module(s) 118 and data 120. The module(s) 120 include, for example, a segmentation module 122, an index generation module 124, an index transfer module 126, and other module(s) 128. The other module(s) 128 may include programs or coded instructions that supplement applications or functions performed by the file indexing system 102. The data 120 may include file data 130, index data 132, and other data 134. The other data 134, amongst other things, may serve as a repository for storing data that is processed, received, or generated as a result of the execution of one or more modules in the module(s) 118.

According to an implementation, the segmentation module 122 of the file indexing system 102 may obtain, from the client device 108, a file to be indexed. According to said implementation, the segmentation module 122 may obtain the file from the client device 108 over the network 110. Further, the file may be a text file. A text file is a file that stores data as a series of alphanumeric characters, usually without any visual formatting information. In one example, content of the file may be a personal note, a journal, a newspaper article, a book, and the like. In one implementation, after obtaining the file to be indexed from the client device 108, the segmentation module 122 may store the file in the file data 130 of the file indexing system 102.

Upon receiving the file to be indexed, the segmentation module 122 may segment the file to generate a plurality of segments. In one implementation, the segmentation module 122 may segment the file into equally sized segments. In another implementation, the segmentation module 122 may segment the file into differently sized segments. Consider a scenario where the segmentation module 122 segments the file into equally sized segments, then, in one example, the segmentation module 122 may segment the file based on a block size used in a Hadoop cluster. As mentioned earlier, the Hadoop cluster is a computational cluster designed for processing data and storing the processed data. In said example, the size of each of the plurality of segments may be equal to or a multiple of the block size used in the Hadoop cluster. For instance, if the block size used by the Hadoop cluster is 64 megabytes (MB) and size of the file is 1 gigabytes (GB), then the segmentation module 122 may segment the file into a plurality of segments of size 64 MB each.

Once the file is segmented into the plurality of segments, the index generation module 124 may initiate indexing of the file. Indexing is a process of converting text data into a format that facilitates rapid searching. In one example, during indexing, content of the file may be associated with various tags or keywords. According to an implementation of the present subject matter, the index generation module 124 may initiate the indexing of the file through a plurality of nodes of a Hadoop cluster. In said implementation, the index generation module 124 may allocate one or more segments from amongst the plurality of segments to each of the plurality of nodes. In one example, the index generation module 124 may equally allocate the plurality of segments among the plurality of nodes. For example, if there are 4 nodes and 16 segments, then the index generation module 124 may allocate 4 segments from amongst the 16 segments to each of the 4 data nodes.

Further, the plurality of nodes may index the plurality of segments of the file to generate a set of indices. The plurality of nodes may generate the set of indices using a Lucene Application Programming Interface (API). Lucene is a Java library which performs indexing and searching process for files. According to an implementation, each of the plurality of nodes may index one or more segments of the file allocated to it to generate at least one index corresponding to the one or more segments. Consider an example where there are 10 nodes and 2 segments are allocated to each of the 10 nodes, then each of the 10 nodes would generate 2 index corresponding to the allocated segments. Therefore, 10 nodes would generate 20 indices corresponding to the file. In one example, the at least one index may store information about the file, including file name, date modified, and properties like author, tags, file content, and rating. Therefore, the indices generated by the plurality of nodes may store information related to the content of the file. For example, the content of the file may be associated with various tags or keywords to facilitate a user to search and view the content of his choice. In one implementation, the index generation module 124 may store the set of indices in the index data 132 of the file indexing system 102.

According to an implementation, after the generation of the set of indices, the index transfer module 126 may store the set of indices onto the distributed file system 104. In said implementation, the distributed file system 104 may be a Hadoop Distributed File System (HDFS). The HDFS is a storage system of the Hadoop cluster. In one implementation, one or more predefined directories may be present on the distributed file system 104. Further, the index transfer module 126 may store the set of indices in the one or more predefined directories.

Thereafter, the index transfer module 126 may transfer the set of indices from the distributed file system 104 to a search engine 106, such as a Solr search engine, over the network 110 to make the file content searchable. As mentioned before, in one implementation, the search engine 106 may be external to the distributed file system 104 and in another implementation; the search engine 106 can be integrated within the distributed file system 104. Further, according to an implementation, the search engine 106 may be a Solr search engine. The solr search engine is an open source enterprise search platform that uses a Lucene Application Programming Interface (API) for full-text indexing and searching. Furthermore, the search engine 106 may include one or more search machines. For example, a Solr search engine may include one or more solr shard instances.

As mentioned above, one or more predefined directories may be present on the distributed file system 104. For each search machine, a predefined directory is present on the distributed file system 104. For example, if the search engine 106 includes only one search machine, then one predefined directory is present in the distributed file system 104 corresponding to the search machine. Therefore, indices meant for a particular search machine may be stored in a predefined directory associated with the search machine.

In one implementation, the index transfer module 126 may transfer at least one index corresponding to the one or more segments, generated by a node from amongst the plurality of nodes, from the distributed file system 104 to the search engine 106 using a transfer protocol, such as a Secure Shell (SSH) protocol, a Hypertext Transfer Protocol (HTTP), etc. In said implementation, the index transfer module 126 may transfer the at least one index generated by each of the plurality of nodes from the distributed file system 104 to the search engine 106 through a respective transfer protocol connection. In another implementation, the index transfer module 126 may transfer the at least one index generated by each of the plurality of nodes from the distributed file system 104 to the search engine 106 through a same transfer protocol connection.

Further, to initiate transfer process, an agent deployed on each of the one or more search machines may be invoked to transfer the set of indices from the distributed file system 104 to the one or more search machines. The agent may be understood as a stand alone java program. In one implementation, the agent may be invoked by a remote client program, for example, a web application. Each of the one or more search machines of the search engine 106 may then merge its respective indices with existing indices to make the file content searchable. In one implementation, a local file system of each of the search machine will hold the respective merged indices.

According to the present subject matter, since the file is first segmented into a plurality of segments and a set of indices is generated corresponding to the plurality of segments, therefore size of each index would be very less in comparison to the single index generated through the conventional approach. As a result, the time taken to transfer the indices to the search engine 106 is significantly alleviated. Further, according to an embodiment of the present subject matter, if there is a network failure or transfer of one or more indices is interrupted, then only those one or more indices may have to be retransmitted and not the entire index, as done by the conventional approach. As a result, the indices are transferred to the search engine 106, such as a Solr search engine, in very less time and network overhead is also eliminated.

Further, as mentioned above, the search engine 106 may be integrated within the distributed file system 104. Therefore, in situations where the search engine 106 is integrated within the distributed file system 106, transmission of the generated indices from the distributed file system 104 to the search engine 106 over the network 110 may not be needed. Since, generation and storage of the indices occur without transfer of indices over the network 110, the network overhead is eliminated and network resources are efficiently consumed. Also, the time delay for storage of the indices onto the distributed file system 104 is alleviated. Thus, according to the present subject matter, the generation and transfer of the indices to the distributed file system 104 is efficient in terms of cost, resources, and time.

Figure 2:
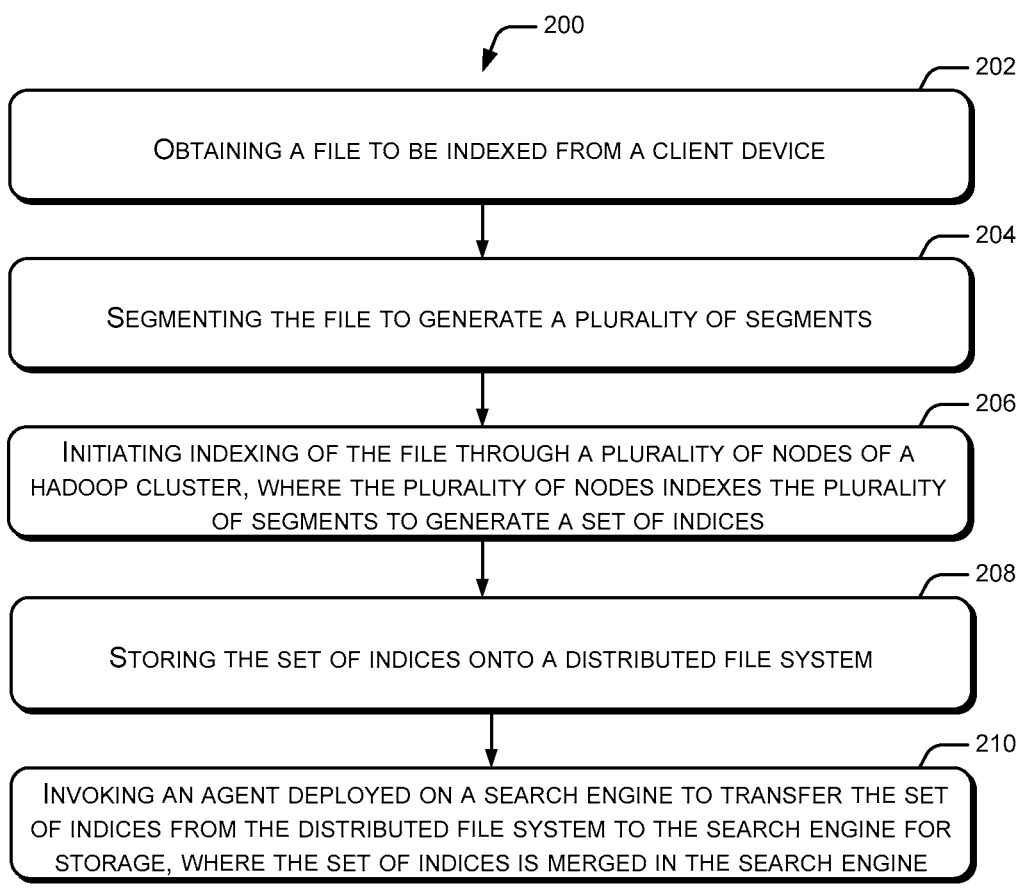
FIG. 2 illustrates a method for indexing a file to be transferred to a search engine for storage, according to an embodiment of the present subject matter.

FIG. 2 illustrates a method 200 for indexing a file to be transferred to a search engine 106 for storage, according to an embodiment of the present subject matter.

The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200, or alternative methods. Additionally, individual blocks may be deleted from the methods without departing from the spirit and scope of the subject matter described herein. Furthermore, the method 200 can be implemented in any suitable hardware, software, firmware, or combination thereof.

Referring to FIG. 2, at block 202, the method 200 includes obtaining a file to be indexed from a client device. In one implementation, the file may be a text file. A text file is a file that stores data as a series of alphanumeric characters, usually without any visual formatting information. In one example, content of the file may be a personal note, a journal, a newspaper article, a book, and the like. According to an implementation, the segmentation module 122 of the file indexing system 102 may obtain the file to be indexed from a client device 108.

At block 204, the method 200 includes segmenting the file to generate a plurality of segments. In one implementation, the file may be segmented into equally sized segments. In another implementation, the file may be segmented into differently sized segments. Consider a scenario where size of the file is 1 gigabytes (GB), then the file may be segmented into a plurality of segments of size 50 MB each. Consider another scenario where size of the file is 1 gigabytes (GB), then the file may be segmented into a plurality of segments such that few segments from amongst the plurality of segments are of size 50 MB each and other few segments are of size 60 MB each. According to an implementation, the segmentation module 122 may segment the file into a plurality of segments.

At block 206, the method 200 includes initiating indexing of the file through a plurality of nodes of a Hadoop cluster, where the plurality of nodes indexes the plurality of segments to generate a set of indices. Indexing is a process of converting text data into a format that facilitates rapid searching. In one implementation, one or more segments from amongst the plurality of segments may be allocated to each of the plurality of nodes. Further, the plurality of nodes may index the plurality of segments of the file to generate a set of indices. The plurality of nodes may generate the set of indices using a Lucene Application Programming Interface (API). Lucene is a Java library which performs indexing and searching process for files. In an implementation, each of the plurality of nodes may index one or more segments of the file allocated to it to generate at least one index corresponding to the one or more segments. According to an implementation of the present subject matter, the index generation module 124 of the file indexing system 102 may initiate the indexing of the file through a plurality of nodes of a Hadoop cluster.

At block 208, the method 200 includes storing the set of indices onto a distributed file system. In one implementation, after the generation of the set of indices, the set of indices may be stored onto the distributed file system. In said implementation, the distributed file system may be a Hadoop Distributed File System (HDFS). The HDFS is a storage system of the Hadoop cluster. Further, one or more predefined directories may be present on the distributed file system and the set of indices may be stored in the one or more predefined directories. According to an implementation, the index transfer module 126 may store the set of indices onto the distributed file system 104.

At block 210, the method 200 includes invoking an agent deployed on a search engine to transfer the set of indices from the distributed file system to the search engine for storage, where the set of indices is merged in the search engine. In one implementation, the search engine may be a Solr search engine. Further, the search engine may include one or more search machines, such as Solr shard instances. In one implementation, to initiate transfer process, an agent deployed on each of the one or more search machines may be invoked to transfer the set of indices from the distributed file system to the one or more search machines. The agent may be understood as a stand alone java program. In one implementation, the agent may be invoked by a remote client program, for example, a web application. Each of the one or more search machines of the search engine may then merge its respective indices with existing indices to make the file content searchable. In one implementation, upon invoking of the agent, the set of indices may be transferred from the distributed file system 104 to the search engine 106 using a transfer protocol, such as a Secure Shell (SSH) protocol, a Hypertext Transfer Protocol (HTTP), etc. In one implementation, the index transfer module 126 may transfer the set of indices from the distributed file system 104 to the search engine 106.

Although embodiments for methods and systems for indexing a file to be stored onto a distributed file system have been described in a language specific to structural features and/or methods, it is to be understood that the invention is not necessarily limited to the specific features or methods described. Rather, the specific features and methods are disclosed as exemplary embodiments for indexing a file to be stored onto a distributed file system.

We claim:

1. A file indexing system for indexing a file to be stored onto a distributed file system, the file indexing system comprising:
   a processor;
   a segmentation module coupled to the processor to segment the file into a plurality of segments, wherein the segmentation module segments the file into at least one of equally sized segments and differently sized segments;
   an index generation module coupled to the processor to initiate indexing of the file through a plurality of nodes of a cluster of the distributed file system, wherein each of the plurality of nodes indexes one or more segments from amongst the plurality of segments to generate at least one index corresponding to the one or more segments, and wherein the indexing of the file is carried out at an enhanced map phase to split the file into the plurality of segments, and wherein the plurality of nodes further index the plurality of segments to generate a set of indices using an Application Programming Interface (API);

an index transfer module coupled to the processor to store the at least one index onto the distributed file system and transfer the at least one index corresponding to the plurality of segments from the distributed file system to a search engine; and the search engine coupled to the processor, wherein the search engine is integrated within the distributed file system and prevents transmission of the generated set of indices over a network.

2. The file indexing system as claimed in claim 1, wherein the segmentation module obtains, from a client device, the file to be indexed.

3. The file indexing system as claimed in claim 1, wherein the at least one index is transferred through a transfer protocol, and wherein the at least one index is merged with existing indices in the search engine.

4. The file indexing system as claimed in claim 1, wherein the index generation module allocates the one or more segments from amongst the plurality of segments to each of the plurality of nodes.

5. The file indexing system as claimed in claim 1, wherein the index transfer module transfers the at least one index from the distributed file system to a search engine for storage.

6. The file indexing system as claimed in claim 3, wherein the at least one index is transferred from the distributed file system to the search engine based on invoking an agent deployed on the search engine.

7. The file indexing system as claimed in claim 3, wherein the transfer protocol includes a Secure Shell (SSH) connection and a Hypertext Transfer Protocol (HTTP).

8. The file indexing system as claimed in claim 1, wherein each of the plurality of nodes generates the at least one index using an Application Programming Interface (API).

9. A method for indexing a file to be stored onto a distributed file system, the method comprising:
   obtaining, from a client device, the file to be indexed;
   segmenting the file to generate a plurality of segments, wherein the plurality of segments are segmented into at least one of equally sized segments and differently sized segments;
   initiating indexing of the file through a plurality of nodes of a cluster of the distributed file system, wherein the plurality of nodes indexes the plurality of segments to generate a set of indices, and wherein each of the plurality of nodes indexes one or more segments from amongst the plurality of segments to generate at least one index corresponding to the one or more segments, further wherein the indexing of the file is carried out at an enhanced map phase to split the file into the plurality of segments and generating a set of indices using an Application Programming Interface (API); and
   storing the set of indices onto the distributed file system, and transferring the set of indices corresponding to the plurality of segments from the distributed file system to a search engine; and
   integrating the search engine within the distributed file system to prevent transmission of the generated set of indices over a network.

10. The method as claimed in claim 9, wherein the method further comprises transferring the set of indices from the distributed file system to a search engine for storage, wherein the set of indices is transferred through a transfer protocol.

11. The method as claimed in claim 9, wherein the method further comprises allocating the one or more segments from amongst the plurality of segments to each of the plurality of nodes.

12. The method as claimed in claim 9, wherein the plurality of nodes generates the set of indices using an Application Programming Interface (API).

13. A non-transitory computer-readable medium having embodied thereon a computer program for executing a method comprising:
   obtaining, from a client device, a file to be indexed;
   segmenting the file to generate a plurality of segments, wherein the plurality of segments are segmented into at least one of equally sized segments and differently sized segments;
   initiating indexing of the file through a plurality of nodes of a cluster of a distributed file system, wherein the plurality of nodes indexes the plurality of segments to generate a set of indices, and wherein each of the plurality of nodes indexes one or more segments from amongst the plurality of segments to generate at least one index corresponding to the one or more segments, further wherein the indexing of the file is carried out at an enhanced map phase to split the file into the plurality of segments and generating a set of indices using an Application Programming Interface (API); and
   storing the set of indices onto a distributed file system, and transferring the set of indices corresponding to the plurality of segments from the distributed file system to a search engine; and
   integrating the search engine within the distributed file system to prevent transmission of the generated set of indices over a network.

14. The non-transitory computer-readable medium as claimed in claim 13 further comprises transferring the set of indices from the distributed file system to a search engine for storage, wherein the set of indices is transferred through a transfer protocol.

15. The non-transitory computer-readable medium as claimed in claim 13 further comprises allocating the one or more segments from amongst the plurality of segments to each of the plurality of nodes.

16. The non-transitory computer-readable medium as claimed in claim 13, wherein the plurality of nodes generates the set of indices using an Application Programming Interface (API).

* * * * *